(12) United States Patent
Emam et al.

(10) Patent No.: US 8,489,284 B2
(45) Date of Patent: Jul. 16, 2013

(54) AUTOMATED DYNAMIC VEHICLE BLIND SPOT DETERMINATION

(75) Inventors: Ossama Emam, Giza (EG); Dimitri Kanevsky, Ossining, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 12/196,042

(22) Filed: Aug. 21, 2008

(65) Prior Publication Data

US 2010/0049393 A1 Feb. 25, 2010

(51) Int. Cl.
*G06F 17/00* (2006.01)

(52) U.S. Cl.
USPC .................. 701/45; 701/49; 340/438

(58) Field of Classification Search
USPC .............. 701/45, 49; 340/438, 435, 439
See application file for complete search history.

(56) References Cited

U.S. PATENT DOCUMENTS

| | | | |
|---|---|---|---|
| 4,811,226 A * | 3/1989 | Shinohara | 701/49 |
| 5,694,259 A * | 12/1997 | Brandin | 359/843 |
| 5,786,772 A * | 7/1998 | Schofield et al. | 340/903 |
| 5,929,786 A * | 7/1999 | Schofield et al. | 340/903 |
| 5,959,367 A * | 9/1999 | O'Farrell et al. | 307/10.1 |
| 5,993,015 A * | 11/1999 | Fredricks | 359/843 |
| 6,340,850 B2 * | 1/2002 | O'Farrell et al. | 307/10.1 |
| 6,484,136 B1 | 11/2002 | Kanevsky et al. | |
| 6,501,536 B1 * | 12/2002 | Fredricks | 356/3.01 |
| 6,772,057 B2 * | 8/2004 | Breed et al. | 701/45 |
| 6,792,339 B2 * | 9/2004 | Basson et al. | 701/1 |
| 6,906,619 B2 * | 6/2005 | Williams et al. | 340/425.5 |
| 7,349,782 B2 | 3/2008 | Churchill et al. | |
| 7,354,166 B2 * | 4/2008 | Qualich et al. | 359/843 |
| 2002/0005778 A1 * | 1/2002 | Breed et al. | 340/435 |
| 2005/0128092 A1 * | 6/2005 | Bukman et al. | 340/576 |
| 2006/0104481 A1 * | 5/2006 | Demro et al. | 382/104 |
| 2007/0115105 A1 * | 5/2007 | Schmitz | 340/439 |
| 2007/0182528 A1 * | 8/2007 | Breed et al. | 340/435 |
| 2008/0012938 A1 * | 1/2008 | Kubota et al. | 348/118 |
| 2008/0042813 A1 * | 2/2008 | Wheatley et al. | 340/435 |
| 2008/0300755 A1 * | 12/2008 | Madau et al. | 701/49 |

OTHER PUBLICATIONS 101 quick reference guide, Aug. 2010.*
Kids and Cars, Technology, website, printed from website Aug. 7, 2008, Kids and Cars, Leawood, Kansas, USA.
Drivaware, Inc. Turn Your Mirror Not Your Head, website, printed from website Aug. 7, 2008, Drivaware, Inc., Ann Arbor Michigan, USA.
TR Corporation Pty Ltd, Vorad—Vehicle On-Board Radar, Brochure, Publication Date Uncertain but Appears to Include a Date of Aug. 2008 in Lower Right Corner, TR Corporation Pty Ltd, Blackburn, Australia.

* cited by examiner

*Primary Examiner* — Darnell Jayne
*Assistant Examiner* — Patrick Hawn
(74) *Attorney, Agent, or Firm* — Lee Law, PLLC; Christopher B. Lee

(57) ABSTRACT

A driver's orientation within a vehicle is monitored. A change in the driver's orientation is detected. A change to a blind spot of the vehicle is calculated based upon the detected change in the driver's orientation. This abstract is not to be considered limiting, since other embodiments may deviate from the features described in this abstract.

18 Claims, 8 Drawing Sheets

AUTOMATED DYNAMIC VEHICLE BLIND SPOT DETERMINATION

BACKGROUND OF THE INVENTION

1. Field of the Invention

The present invention relates to systems and methods for determining blind spot regions associated with a vehicle. More particularly, the present invention relates to automated dynamic vehicle blind spot determination.

2. Related Art

Blind spots are areas around a vehicle that are not visible to a driver while the driver is seated within the driver's seat of the vehicle. Typical blind spot areas are located to the sides and back areas of the vehicle. Vehicles have rear view and side view mirrors to allow drivers to see portions of areas to the rear area and sides of vehicles.

BRIEF SUMMARY OF THE INVENTION

The subject matter described herein provides dynamic vehicle blind spot determination based upon changing characteristics associated with a driver and a vehicle's surrounding environment. As the driver's orientation changes, the blind spot positions and dimensions change. For example, characteristics of the vehicle, such as seat position and seat height, and characteristics of the driver's orientation, such as height, position within a driver's seat, physical movement within the driver's seat, eye activity, head position, and other characteristics, all affect blind spot positions and dimensions. The driver's orientation is monitored and changes in the driver's orientation are automatically detected. A resulting change to the blind spot is calculated. Dangerous situation history is statistically modeled and used to predict dangerous situations based upon at least one of the automatically detected change in the driver's orientation and the calculated change to the blind spot. At least one of the calculated change to the blind spot and the predicted dangerous situation is communicated to the driver's vehicle or to another vehicle. The statistical model is updated to reflect new dangerous situations that are identified.

A method includes monitoring a driver's orientation within a first vehicle, detecting a change in the driver's orientation, and calculating a change to a blind spot of the first vehicle based upon the detected change in the driver's orientation.

A system includes a memory adapted to store vehicle characteristics associated with a first vehicle; and a processor programmed to monitor a driver's orientation within the first vehicle, detect a change in the driver's orientation, and calculate a change to a blind spot of the first vehicle based upon the detected change in the driver's orientation and the stored vehicle characteristics.

An alternative system includes a memory adapted to store vehicle characteristics associated with a first vehicle and a statistical model of dangerous situations; and a processor programmed to monitor a driver's orientation within the first vehicle, detect a change in the driver's orientation, detect a change in at least one of an eye position of the driver, a head position of the driver, a body position of the driver, and an activity of the driver, determine at least one characteristic associated with the first vehicle, the at least one characteristic comprising at least one of a size of the first vehicle, a mirror adjustment associated with the first vehicle, a speed of the first vehicle, a driver's seat height, a driver's seat position, and a steering angle of the first vehicle, calculate a change to at least one of a blind spot shape, blind spot dimensions, and a blind spot location of the first vehicle based upon the detected change in the driver's orientation and the determined at least one characteristic associated with the first vehicle, read the statistical model of dangerous situations from the memory, apply at least one of the detected change in the driver's orientation and the calculated change to the blind spot to the statistical model of dangerous situations, predict a dangerous situation associated with the first vehicle based upon a result of the at least one of the detected change in the driver's orientation and the calculated change to the blind spot applied to the statistical model of dangerous situations, communicate information associated with at least one of the calculated change to the blind spot and the predicted dangerous situation to at least one of the first vehicle and a second vehicle, update the statistical model of dangerous situations based upon data associated with the predicted dangerous situation, and store the updated statistical model of dangerous situations to the memory.

A computer program product includes a computer useable medium including a computer readable program. The computer readable program when executed on a computer causes the computer to monitor a driver's orientation within the first vehicle, detect a change in the driver's orientation, and calculate a change to a blind spot of the first vehicle based upon the detected change in the driver's orientation and the stored vehicle characteristics.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic vehicle blind spot determination based upon changing characteristics associated with a driver and a vehicle's surrounding environment. As the driver's orientation changes, the blind spot positions and dimensions change. For example, characteristics of the vehicle, such as seat position and seat height, and characteristics of the driver's orientation, such as height, position within a driver's seat, physical movement within the driver's seat, eye activity, head position, and other characteristics, all affect blind spot positions and dimensions. The driver's orientation is monitored and changes in the driver's orientation are automatically detected. A resulting change to the blind spot is calculated. Dangerous situation history is statistically modeled and used to predict dangerous situations based upon at least one of the automatically detected change in the driver's orientation and the calculated change to the blind spot. At least one of the calculated change to the blind spot and the predicted dangerous situation is communicated to the driver's vehicle or to another vehicle. The statistical model is updated to reflect new dangerous situations that are identified.

The dynamic vehicle blind spot determination described herein may be performed in real time to allow prompt notification and alerting. For purposes of the present description real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 1:
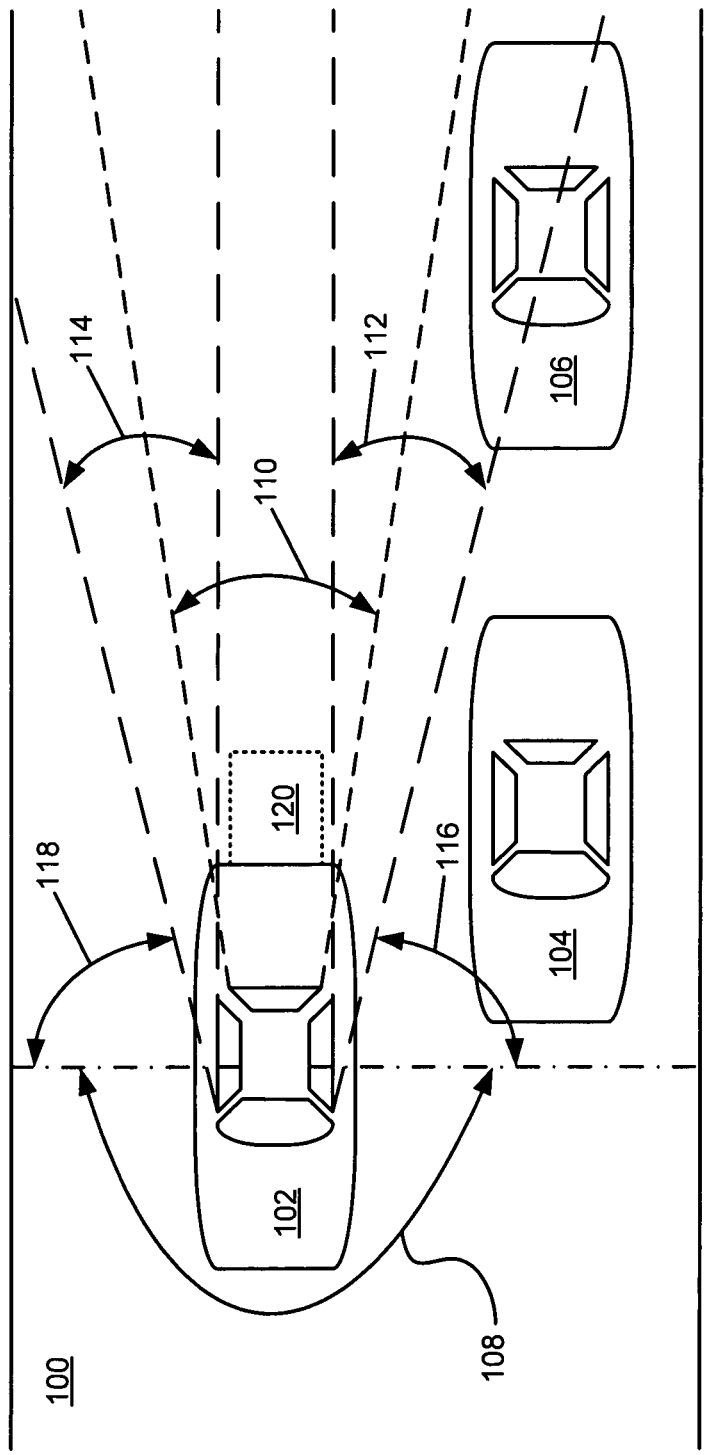
FIG. 1 is a diagram of an example of a roadway environment that illustrates example initial vehicle blind spots based upon an initial driver orientation according to an embodiment of the present subject matter.
Figure 2:
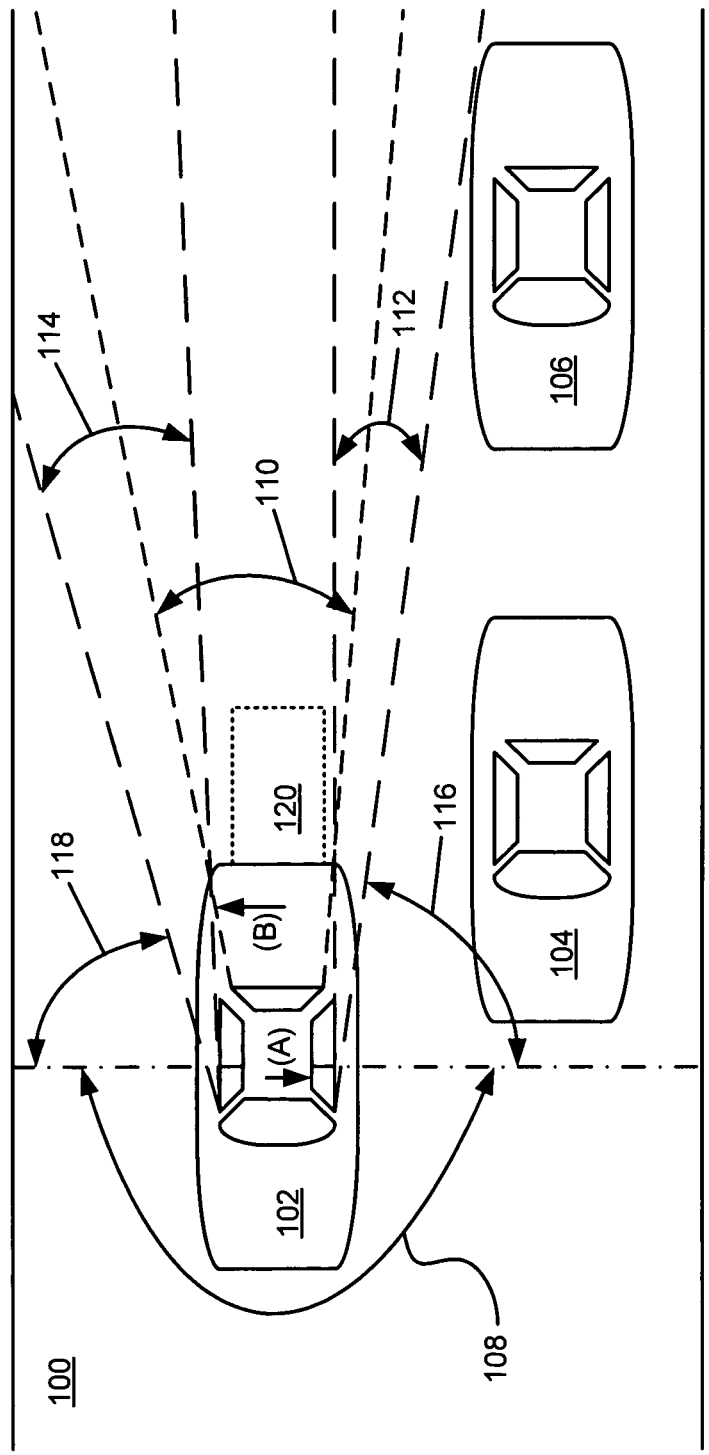
FIG. 2 is an example of the roadway environment of FIG. 1 that illustrates dynamic changes to blind spot regions associated with a vehicle based upon changes in the driver's orientation within the vehicle according to an embodiment of the present subject matter.
Figure 3:
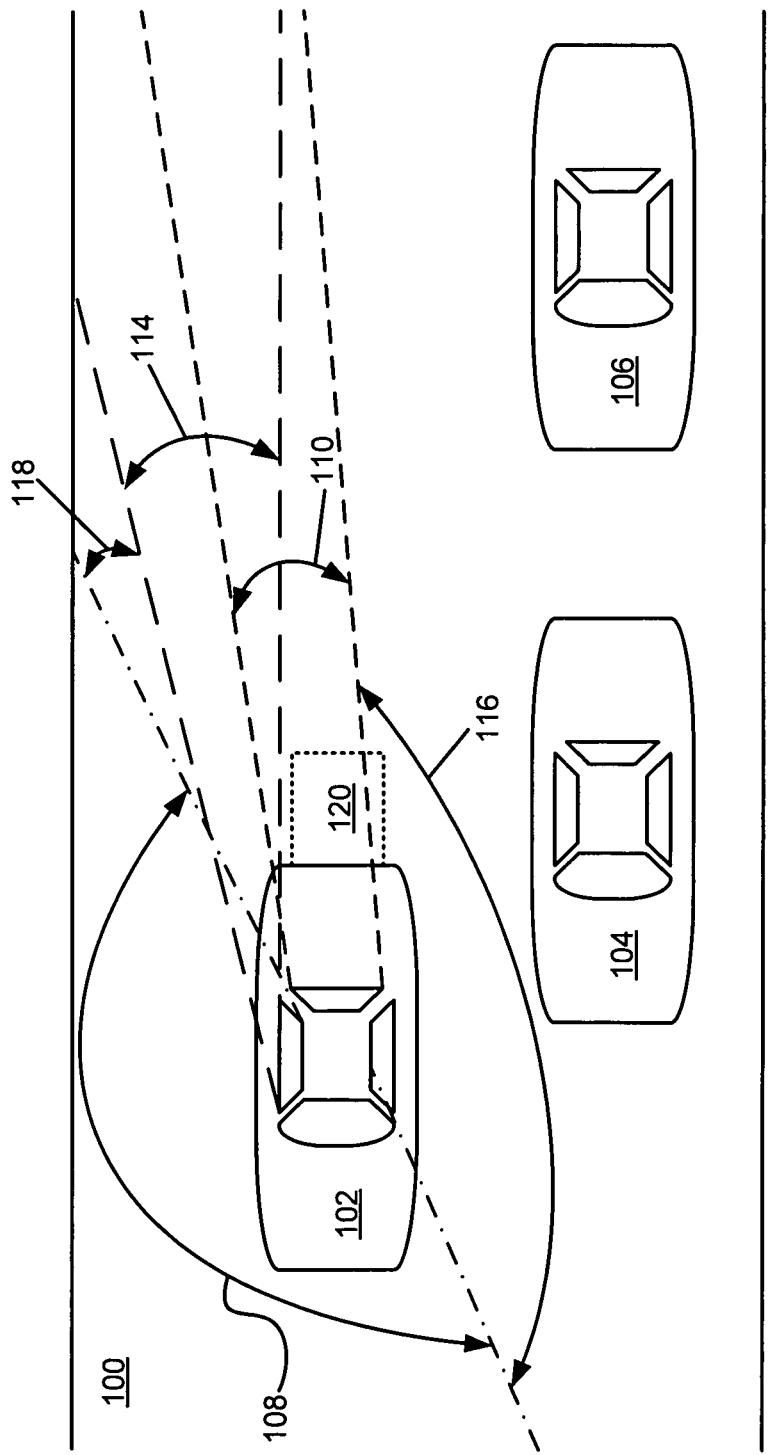
FIG. 3 is an example of the roadway environment of FIG. 1 that illustrates dynamic changes to blind spot regions associated with a vehicle based upon a driver of the vehicle turning his or her head to the right to either look into a right side mirror of the vehicle or to talk with a passenger located within a passenger seat of the vehicle according to an embodiment of the present subject matter.

The examples of FIG. 1 through FIG. 3 below provide context for the technical description that follows. FIG. 1 through FIG. 3 illustrate examples of dynamic changes that may occur to blind spots that are associated with a vehicle based upon changes in orientation of a driver within that vehicle. Within FIG. 1 through FIG. 3, it is assumed that the vehicles described below are traveling from the right to the left within the respective illustrations.

FIG. 1 is a diagram of an example of a roadway environment 100 that illustrates example initial vehicle blind spots based upon an initial driver orientation. A vehicle 102, a vehicle 104, and a vehicle 106 are shown in association with the roadway environment 100. The vehicle 102 is shown with visible areas and blind spot areas associated with it.

A visible area 108 represents a forward view range for a driver of the vehicle 102. The visible area 108 represents approximately 180 degrees of visible area including peripheral vision capabilities of the driver and is approximately perpendicular to a direction of travel of the vehicle 102. As can been seen from FIG. 1, both the vehicle 104 and the vehicle 106 are outside of the visible area 108. In order to assist the driver of the vehicle 102 with viewing vehicles outside of the visible area 108, the vehicle 102 is equipped with certain minors, such as a rear view mirror, a left side mirror, and a right side mirror. The rear view minor, the left side mirror, and the right side minor are not shown for ease of illustration purposes. A person of skill in the art will be able to determine appropriate locations for the rear view minor, the left side minor, and the right side minor based upon the present description.

When the driver of the vehicle 102 uses the rear view mirror, a rear viewable area 110 may be seen by the driver of the vehicle 102. As can be seen from FIG. 1, the driver of the vehicle 102 is unable to see the vehicle 104 and the vehicle 106 within the rear viewable area 110.

In order to allow the driver of the vehicle 102 to see additional areas behind the visible area 108, the left side mirror and right side mirror are used. A left rear viewable area 112 and a right rear viewable area 114 represent viewable areas behind the visible area 108 that may be seen by the driver of the vehicle 102 using the left side mirror and the right side mirror, respectively. As can be seen from FIG. 1, the driver of the vehicle 102 may be able to see a portion of the vehicle 106 within the left rear viewable area 112 provided by the left side mirror. However, the driver cannot see the vehicle 104 within the left rear viewable area 112.

Gaps in viewable coverage of the rear view mirror, the left side mirror, and the right side mirror are considered blind spots for purposes of the present subject matter. Accordingly, a left blind spot region 116 represents a viewable gap in viewable area located outside of the visible area 108 and the left rear viewable area 112. As a result, the driver of the vehicle 102 must turn his or her head in the direction of the vehicle 104 to be able to see the vehicle 104. A similar right blind spot region 118 is located on the right side of the vehicle 102 outside of the visible area 108 and the right rear viewable area 114.

As will be described in more detail below, the dimensions of the left blind spot region 116 and the right blind spot region 118 dynamically change in response to a variety of factors, such as the driver's orientation within the vehicle 102 and changes in the driver's orientation and activity. It should also be noted that a rear blind spot region 120 is located behind the vehicle 102. For a given orientation of the driver within the vehicle 102, the location and dimensions of the rear blind spot region 120 may be considered relatively fixed based upon characteristics of the vehicle 102, such as a height and width of the vehicle 102. As will also be described in more detail below, as the driver of the vehicle 102 changes his or her orientation within the vehicle 102, the dimensions of the rear blind spot region 120 will also change.

FIG. 2 is an example of the roadway environment 100 of FIG. 1 that illustrates dynamic changes to blind spot regions associated with the vehicle 102 based upon changes in the driver's orientation within the vehicle 102. For purposes of the present example, it is assumed that the driver has leaned to his or her left, for example to place an elbow on an armrest on the left side door of vehicle 102, as represented by arrow (A). It is further assumed that the driver has slouched within a driver's seat of the vehicle 102, perhaps due to fatigue or a favorite song coming on the radio of the vehicle 102, and that the driver is looking forward.

As can be seen from FIG. 2, as a result of the drivers change in orientation to be positioned lower and toward the left side of the vehicle 102, yet still looking forward, the visible area 108 remains approximately perpendicular to the direction of travel of the vehicle 102. However, incident angles of the driver's eyesight upon each of the front mirror, the left side mirror, and the right side mirror have changed. Accordingly, each of the rear viewable area 110, the left rear viewable area 112, and the right rear viewable area 114 have also dynamically changed in response to the change in the driver's orientation within the vehicle 102.

As can be seen from FIG. 2, the rear viewable area 110 is shifted slightly to the right rear of the vehicle 102 as represented generally by arrow (B). Additionally, the left rear viewable area 112 has been shifted toward the right rear of the vehicle 102 and slightly narrowed. The right rear viewable area 114 has also shifted toward the right rear of the vehicle 102 and slightly expanded. However, it should be noted that because of the driver's change in physical orientation within the vehicle 102 the right rear viewable area 114 has changed such that driver can no longer see the vehicle 106 within the right rear viewable area 114.

Based upon the dynamic changes in the rear viewable area 110, the left rear viewable area 112, and the right rear viewable area 114, the left blind spot region 116 has expanded in size and the right blind spot region 118 has decreased in size. It should also be noted that the rear blind spot region 120 has additionally changed in dimension due to the driver slouching within the driver's seat of the vehicle 102. As can be seen from FIG. 2, the rear blind spot region 120 has been lengthened relative to the length of the vehicle 102.

These changes in the viewable areas and blind spots around the vehicle 102 may result in the driver's inability to see obstacles and other vehicles within the roadway environment 100 as easily as if the driver was sitting up and centered within the driver's seat of the vehicle 102. Accordingly, for purposes of the present subject matter, such a change in the driver's orientation within the vehicle 102 may be considered a dangerous or potentially dangerous situation.

FIG. 3 is an example of the roadway environment 100 of FIG. 1 that illustrates dynamic changes to blind spot regions associated with the vehicle 102 based upon the driver of the vehicle 102 turning his or her head to the right to either look into the right side mirror of the vehicle 102 or to talk with a passenger located within a passenger seat of the vehicle 102. As can be seen from FIG. 3, several changes to the viewable areas and blind spot regions are illustrated. The visible are 108 is no longer approximately perpendicular to the direction of travel to the vehicle 102 within the roadway environment 100. Accordingly, the driver of the vehicle 102 can no longer see certain areas near the left front and left side of the vehicle 102. However, the driver can see addition areas to the right side and right rear of the vehicle 102 within the visible area 108.

It should be noted that because the driver has turned his or her head to the right within the vehicle 102, the driver can no longer see the left side mirror, even with consideration of peripheral vision capabilities of the driver. Accordingly, the left rear viewable area 112 is not depicted within FIG. 3 at all to illustrate that the driver cannot see any areas to the left or rear of the vehicle 102 within the left side mirror. The rear viewable area 110 and the right rear viewable area 114 are also dynamically changed in dimension with associated changes to the left blind spot region 116 and the right blind spot region 118. The dimensions of the rear blind spot region 120 will depend upon the physical orientation of the driver within the driver's seat of the vehicle 102.

It should be noted that the left blind spot region 116 has been increased such that the driver of the vehicle 102 cannot see any portion of the vehicle 104 or the vehicle 106. These changes in the viewable areas and blind spots around the vehicle 102 may result in increased risk of a collision when compared with either of the representations within FIG. 1 or FIG. 2. Accordingly, for purposes of the present description this may be considered a dangerous situation.

Figure 4:
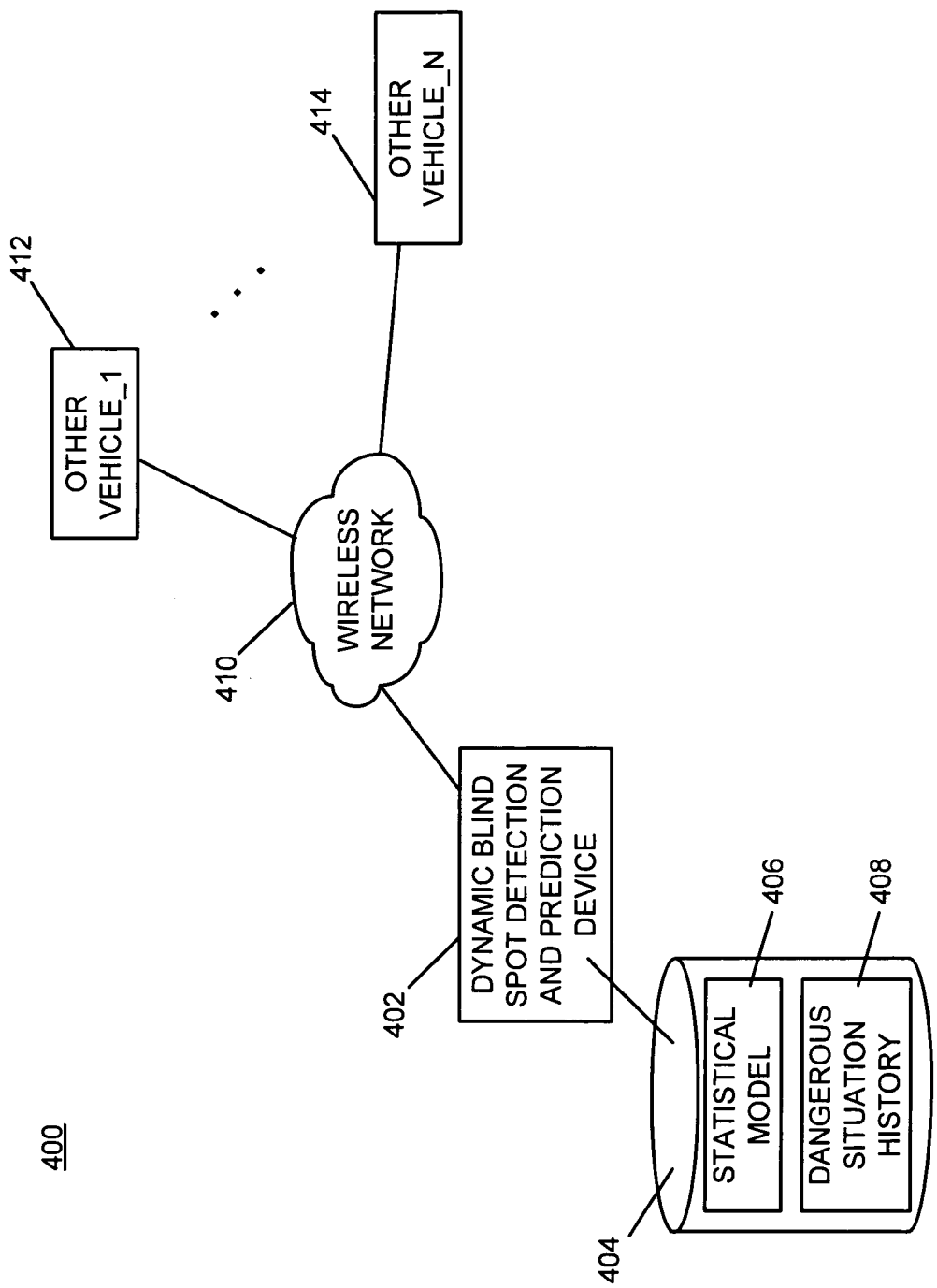
FIG. 4 is a block diagram of an example of an implementation of a system that provides automated dynamic vehicle blind spot determination based upon changes in a driver's orientation within a vehicle according to an embodiment of the present subject matter.

FIG. 4 is a block diagram of an example of an implementation of a system 400 that provides automated dynamic vehicle blind spot determination based upon changes in a driver's orientation within a vehicle. Within the system 400, a dynamic vehicle blind spot detection and prediction device 402 provides the dynamic vehicle blind spot detection capabilities of the present subject matter. Additionally, the dynamic blind spot detection and prediction device 402 accesses a database 404 including a statistical model 406 and a dangerous situation history repository 408 to facilitate prediction of dangerous situations within a roadway environment, such as the roadway environment 100 of FIG. 1 though FIG. 3 above.

The statistical model 406 may include any of a variety of probabilistic models, such as a Gaussian, uniform, or other stochastic/statistical model, that describes mathematical relationships between dangerous situations associated with a vehicle, such as the vehicle 102. For example, dangerous driver characteristics for the driver of the vehicle 102, dangerous blind spot coordinates associated with a vehicle 102 based upon the dangerous driver characteristics, dangerous information about the vehicle 102 (e.g., speed, orientation, steering angle relative to speed, etc.), and dangerous characteristics of an environment surrounding the vehicle 102, such as dangerous weather conditions (e.g., fog, rain, etc.), and dangerous conditions associated with other surrounding vehicles, such as the vehicle 104 and the vehicle 106, are all possible dangerous characteristics that may be modeled by the statistical model 406. Many other dangerous characteristics are possible and all are considered within the scope of the present subject matter.

The dangerous situation history repository 408 stores historical information about the dangerous driver characteristics of the driver of the vehicle 102, the dangerous blind spot coordinates associated with a vehicle 102, the dangerous information about the vehicle 102, and dangerous characteristics of an environment surrounding the vehicle 102. This historical information is accessed by the dynamic vehicle blind spot detection and prediction device 402 to process the statistical model 406 to predict potential or actual dangerous situations associated with the vehicle 102.

The dynamic vehicle blind spot detection and prediction device 402 communicates via a wireless network 410 with another vehicle_1 412 through another vehicle_N 414. This communication includes alerting the other vehicle_1 412 through the other vehicle_N 414 to potential or actual dangerous situations identified by the dynamic vehicle blind spot detection and prediction device 402. For purposes of the present description, the wireless network 410 may include any communication connection capable of providing communications between two moving vehicles. For example, the wireless network 410 may include a cellular network, direct Bluetooth connectivity, and any other wireless network or direct wireless connectivity capable of providing communication between vehicles traveling in proximity to one another.

As will be described in more detail below in association with FIG. 5 through FIG. 8, the dynamic vehicle blind spot detection and prediction device 402 provides dynamic vehicle blind spot detection by monitoring a driver's orientation within a vehicle, such as the vehicle 102 of FIG. 1. The dynamic vehicle blind spot detection and prediction device 402 detects changes in a driver's orientation within the vehicle 102 and calculates a change to a blind spot of the vehicle 102 based upon the detected change in the driver's orientation within the vehicle 102.

As described above, the dynamic blind spot detection and dangerous situation identification capabilities of the dynamic blind spot detection and prediction device 402 may also be based upon dangerous situation profiles stored within the dangerous situation history repository 408 within the database 404. These dangerous situation profiles may be updated and modified over time to improve accuracy association with the detection and prediction capabilities of the dynamic blind spot detection and prediction device 402. Furthermore, as new dangerous situations are identified, either by actual or near collisions associated with the vehicle 102, the dynamic blind spot detection and prediction device 402 updates the statistical model 406 and the dangerous situation history repository 408 within the database 404 to include profile information associated with the new dangerous situation. Accordingly, the statistical model 406 and a dangerous situation history repository 408 are modified over time with updated information and the dynamic blind spot detection and prediction device 402 increases its processing capabilities based upon the modifications to the statistical model 406 and the historical information provided by the dangerous history repository 408.

It should be noted that the dynamic blind spot detection and prediction device 402 may be a portable or fixed computing device within the vehicle 102. The dynamic blind spot detection and prediction device 402 may also be associated with other types of vehicles, such as a plane, train, or other moving vehicle, without departure from the scope of the present subject matter. It should also be noted that the dynamic blind spot detection and prediction device 402 may be any computing device capable of processing information as described above and in more detail below. For example, the dynamic blind spot detection and prediction device 402 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

Figure 5:
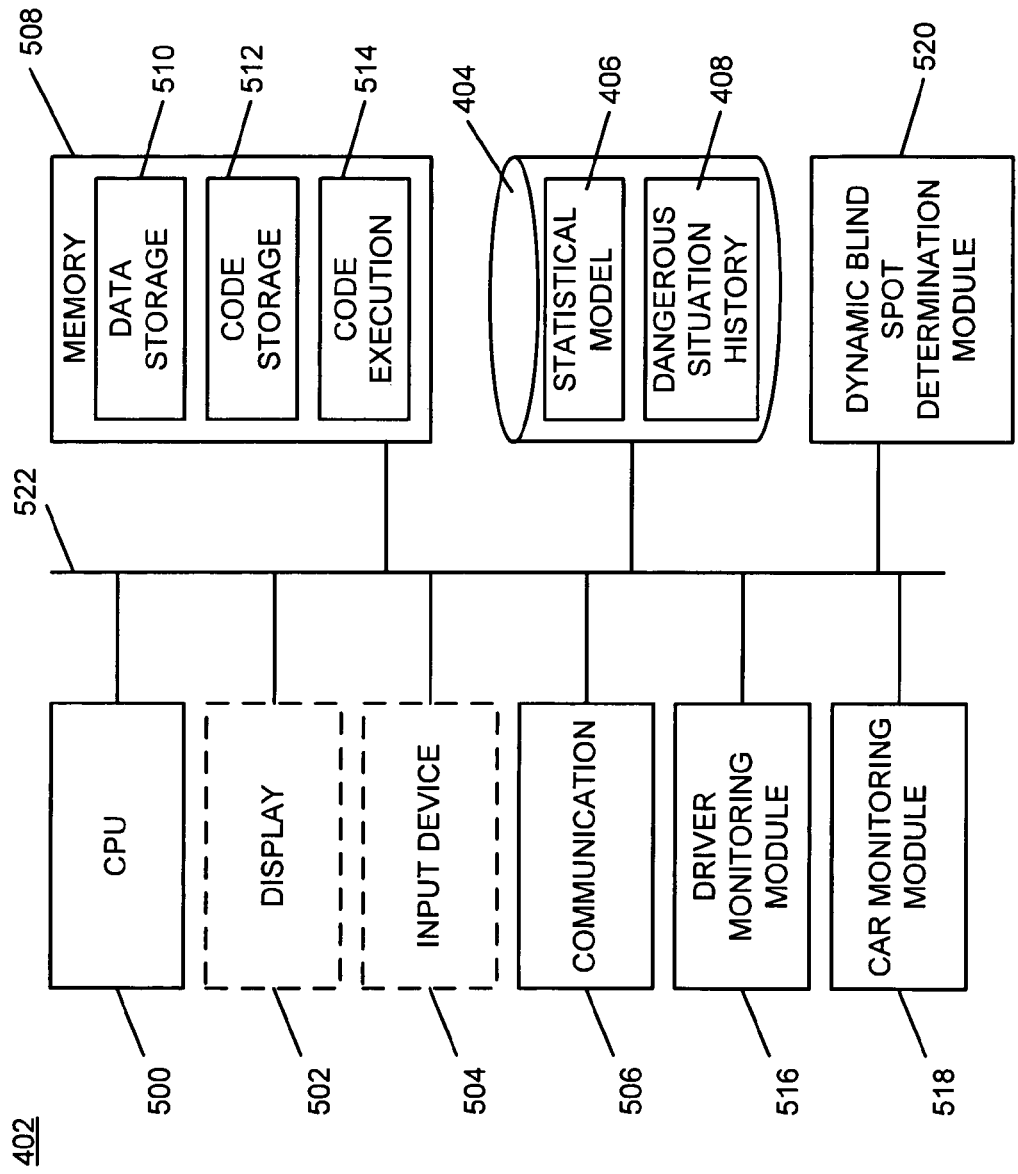
FIG. 5 is a block diagram of an example of an implementation of a dynamic blind spot detection and prediction device that provides the automated dynamic vehicle blind spot determination and dangerous situation prediction within a system, such as the system of FIG. 4, according to an embodiment of the present subject matter.

FIG. 5 is a block diagram of an example of an implementation of the dynamic blind spot detection and prediction device 402 that provides the automated dynamic vehicle blind spot determination and dangerous situation prediction within a system, such as the system 400 of FIG. 4. A central processing unit (CPU) 500 provides computer instruction execution, computation, and other capabilities within the dynamic blind spot detection and prediction device 402. A display 502 provides visual information to a user of the dynamic blind spot detection and prediction device 402 and an input device 504 provides input capabilities for the user.

The display 502 may include any display device, such as a cathode ray tube (CRT), liquid crystal display (LCD), light emitting diode (LED), projection, touchscreen, or other display element or panel. The input device 504 may include a computer keyboard, a keypad, a mouse, a pen, a joystick, or any other type of input device by which the user may interact with and respond to information on the display 502. The display 502 and the input device 504 provide user configurability and feedback for operations associated with the dynamic blind spot detection and prediction device 402. For example, the display 502 may present status associated with the dynamic blind spot detection and prediction device 402. Additionally, the input device 504 may provide configuration options, such as enabling and disabling, the capabilities of the dynamic blind spot detection and prediction device 402. Additionally, different profiles may be created for the dynamic blind spot detection and prediction device 402 based upon user preferences, traffic conditions, traffic congestion (e.g., rush hour, country driving, etc.), and many other types of conditions. Accordingly, all such user preferences and/or traffic-based conditions may be created, viewed, modified, edited, or otherwise manipulated by a user of the dynamic blind spot detection and prediction device 402 via the display 502 and the input device 504.

It should be noted that the display 502 and the input device 504 are illustrated with a dashed-line representation within FIG. 5 to indicate that they are not required components for the dynamic blind spot detection and prediction device 402. Accordingly, the dynamic blind spot detection and prediction device 402 may operate as a completely automated embedded device without user configurability or feedback. However, the dynamic blind spot detection and prediction device 402 may also provide user configurability and feedback via the display 502 and the input device 504, respectively.

A communication module 506 provides interconnection capabilities that allow the dynamic blind spot detection and prediction device 402 to communicate with other modules within the system 400, such as the other vehicle_1 412 through the other vehicle_N 414. The communication module 506 may include any electrical, protocol, and protocol conversion capabilities useable to provide the interconnection capabilities. Though the communication module 506 is illustrated as a component-level module for ease of illustration and description purposes, it should be noted that the communication module 506 includes any hardware, programmed processor(s), and memory used to carry out the functions of the communication module 506 as described above and in more detail below. For example, the communication module 506 may include additional controller circuitry in the form of application specific integrated circuits (ASICs), processors, antennas, and/or discrete integrated circuits and components for performing communication and electrical control activities associated with the communication module 506. Additionally, the communication module 506 also includes interrupt-level, stack-level, and application-level modules as appropriate. Furthermore, the communication module 506 includes any memory components used for storage, execution, and data processing for performing processing activities associated with the communication module 506. The communication module 506 may also form a portion of other circuitry described without departure from the scope of the present subject matter.

A memory 508 includes a data storage area 510, a code storage area 512, and a code execution area 514. The data storage area 510, the code storage area 512, and the code execution area 514 store data, code, and provide memory space for code execution, respectively. The memory 508 may be used by any module associated with the dynamic blind spot detection and prediction device 402 and may store and execute instructions executable by the CPU 500 for performing any functions associated with any associated modules, including instructions associated with an operating system and functionality. The CPU 500 executes these instructions to provide the processing capabilities described above and in more detail below for the dynamic blind spot detection and prediction device 402.

It is understood that the memory 508 may include any combination of volatile and non-volatile memory suitable for the intended purpose, distributed or localized as appropriate, and may include other memory segments not illustrated within the present example for ease of illustration purposes. For example, the memory 508 may include a code storage area, a code execution area, and a data area without departure from the scope of the present subject matter.

The database 404 is also illustrated within FIG. 5 and provides storage capabilities for information associated with the automated dynamic vehicle blind spot determination and dangerous situation prediction capabilities of the dynamic blind spot detection and prediction device 402. It should be noted that, while the example of FIG. 5 illustrates the database 404 as a separate module, the information stored in association with the database 404 may be alternatively stored within the memory 508 without departure from the scope of the present subject matter.

A driver monitoring module 516 provides driver monitoring capabilities for the dynamic blind spot detection and prediction device 402. A car monitoring module 518 provides vehicle monitoring capabilities for the dynamic blind spot detection and prediction device 402. A dynamic blind spot determination module 520 provides the analytical capabilities for driver modeling, blind spot determination, and dangerous situation prediction capabilities for the dynamic blind spot detection and prediction device 402. Each of the driver monitoring module 516, the car monitoring module 518, and the dynamic blind spot determination module 520 will be described in more detail in association with FIG. 6 below.

It should be noted that though the driver monitoring module 516, the car monitoring module 518, and the dynamic blind spot determination module 520 are illustrated as a component-level modules for ease of illustration and description purposes, it should be noted that each of the driver monitoring module 516, the car monitoring module 518, and the dynamic blind spot determination module 520 includes any hardware, programmed processor(s), and memory used to carry out the respective functions of the module as described above and in more detail below. For example, each module may include additional controller circuitry in the form of application specific integrated circuits (ASICs), processors, antennas, and/or discrete integrated circuits and components for performing communication and electrical control activities associated with the respective module. Additionally, each module also includes interrupt-level, stack-level, and application-level modules as appropriate. Furthermore, the each module includes any memory components used for storage, execution, and data processing for performing processing activities associated with the respective module. Each of the driver monitoring module 516, the car monitoring module 518, and the dynamic blind spot determination module 520 may also form a portion of other circuitry described without departure from the scope of the present subject matter.

The CPU 500, the display 502, the input device 504, the communication module 506, the memory 508, the database 404, the driver monitoring module 516, the car monitoring module 518, and the dynamic blind spot determination module 520 are interconnected via an interconnection 522. The interconnection 522 may include a system bus, a network, or any other interconnection capable of providing the respective components with suitable interconnection for the respective purpose.

It should be noted that the dynamic blind spot detection and prediction device 402 is described as a single device for ease of illustration purposes. Such a device may be placed within a single vehicle, such as the vehicle 102 and may communicate predicted and/or actual dangerous conditions to communication receiver devices associated with the vehicle 104 and the vehicle 106.

However, it should be noted that the dynamic blind spot detection and prediction device 402 may also be distributed as a combination of devices. This combination of devices may be distributed among and across vehicles that travel in proximity to one another. For example, the driver monitoring module 516 and the car monitoring module 518 may be located in the vehicle 102 and communicate changes in driver orientation and vehicle information associated with the vehicle 102 to the vehicle 104 and the vehicle 106. In such a situation, the vehicle 104 and the vehicle 106 may include the dynamic blind spot determination module 520 and calculate changes to blind spots associated with the vehicle 102 and dangerous or potentially dangerous situations without depending upon additional calculations and communications from the vehicle 102. Additionally, a module similar to the car monitoring module 518 may be located in one or more separate vehicles, such as the vehicle 104 and the vehicle 106, that communicate information associated with each respective vehicle to the dynamic blind spot determination module 520 located in the vehicle 102. Many other combinations and distributions of components are possible and all are considered within the scope of the present subject matter.

Figure 7:
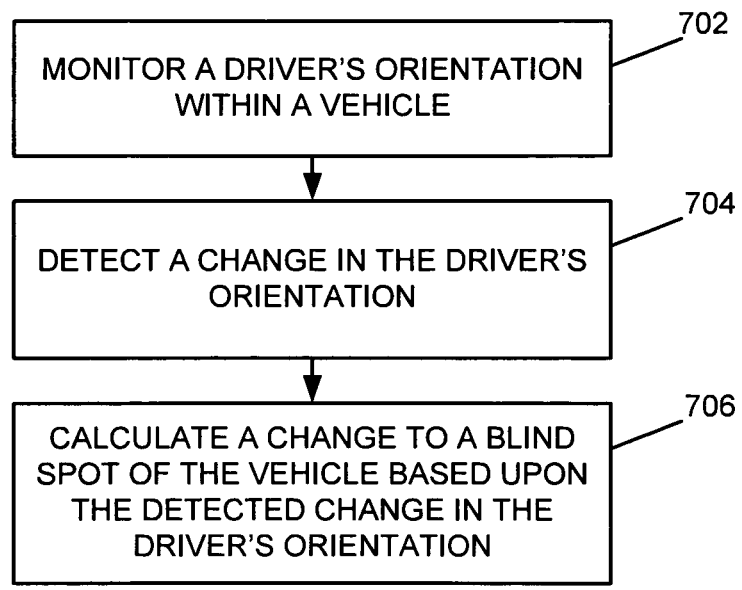
FIG. 7 is a flow chart of an example of an implementation of a process that automatically calculates changes to a blind spot of a vehicle based upon detected changes in a driver's orientation within the vehicle according to an embodiment of the present subject matter.
Figure 8:
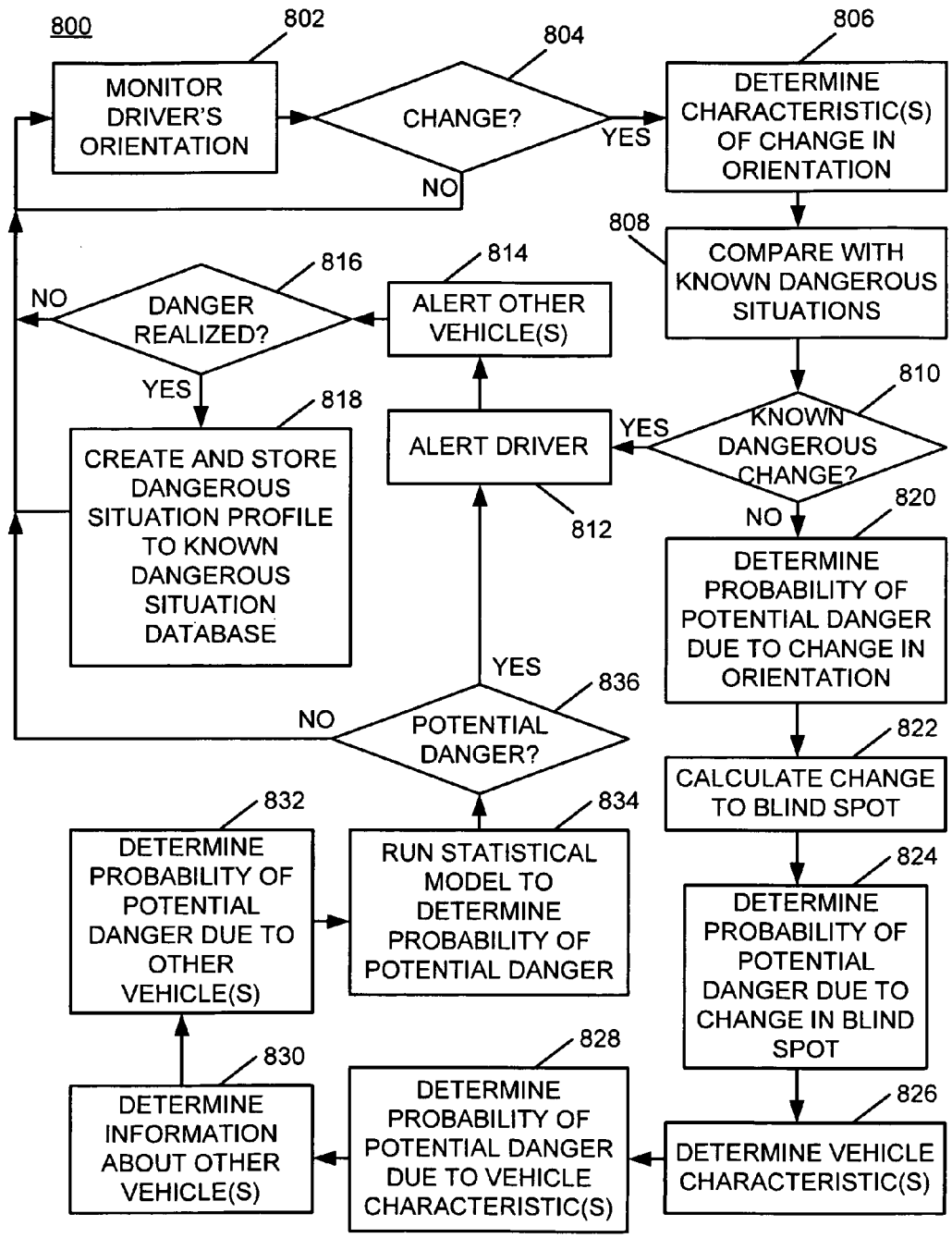
FIG. 8 is a flow chart of an example of an implementation of a process that automatically calculates changes to a blind spot of a vehicle by executing a probabilistic model, identifies dangerous and potentially dangerous situations, and alerts other vehicles of any identified dangerous or potentially dangerous situations according to an embodiment of the present subject matter.

Accordingly, the dynamic blind spot detection and prediction device 402 may take many forms and may be associated with many platforms. FIG. 7 and FIG. 8 below describe example processes that may be executed by the dynamic blind spot detection and prediction device 402 to perform the automated dynamic vehicle blind spot determination and dangerous situation prediction associated with the present subject matter.

Figure 6:
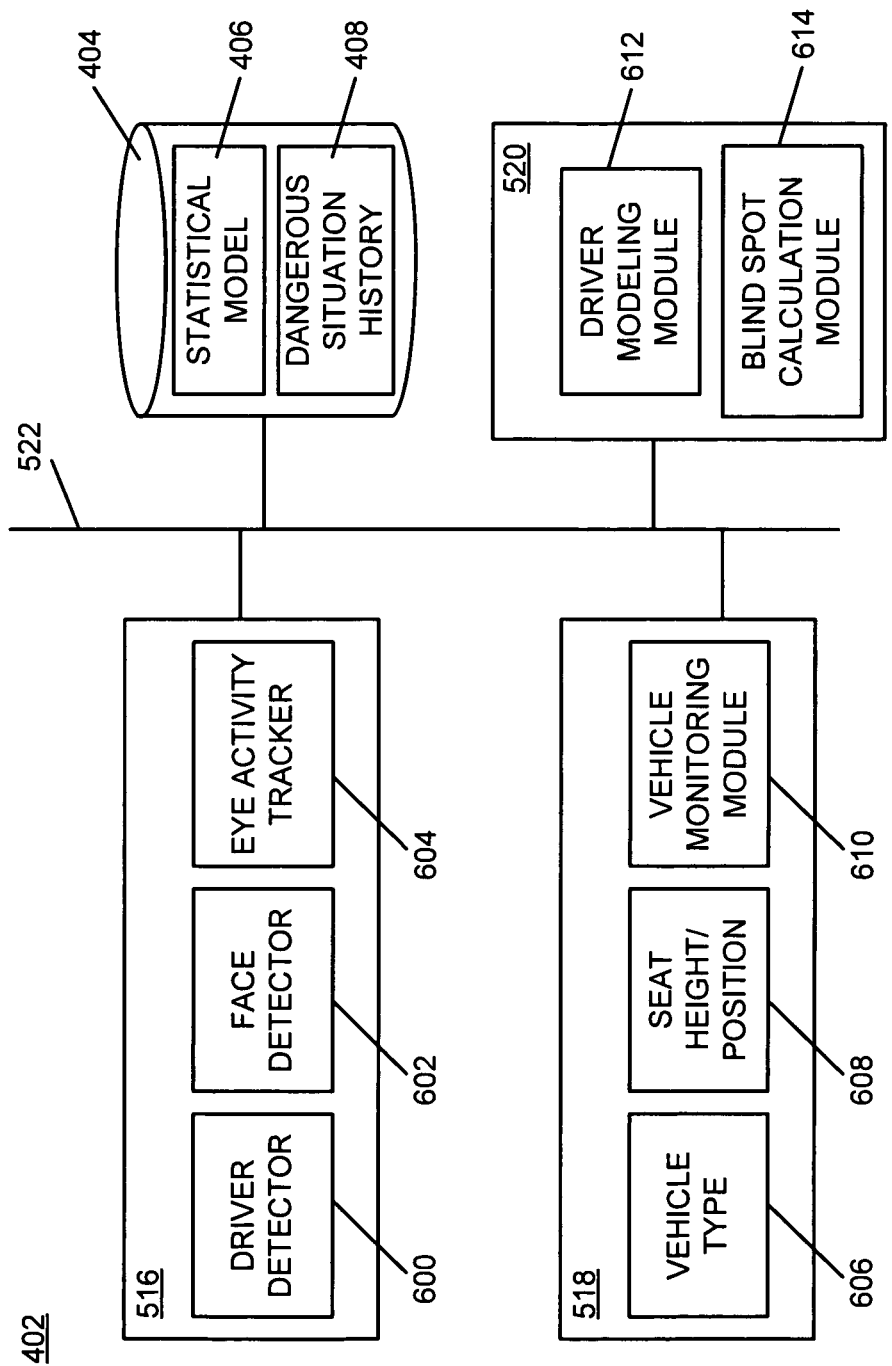
FIG. 6 is a block diagram showing more detail associated with an example driver monitoring module, car monitoring module, and dynamic blind spot determination module of the example implementation of the dynamic blind spot detection and prediction device of FIG. 5 according to an embodiment of the present subject matter.

FIG. 6 is a block diagram showing more detail associated with the example driver monitoring module 516, the car monitoring module 518, and the dynamic blind spot determination module 520 of the example implementation of the dynamic blind spot detection and prediction device 402 of FIG. 5. As can be seen from FIG. 6, each of the driver monitoring module 516, the car monitoring module 518, and the dynamic blind spot determination module 520 includes several example modules that may be used to perform the respective functions of each module.

The driving monitoring module 516 includes a driver detector module 600, a face detector module 602, and an eye activity tracker module 604. The driver detector module 600 includes one or more detectors, such as a camera and/or infrared detector, to detect an orientation of the driver within the vehicle 102. For purposes of the present description, the orientation of the driver includes aspects of the driver's orientation, such as a head position of the driver, a body position of the driver, a posture of the driver, and other characteristics of the driver's orientation within the vehicle 102. The face detector module 602 utilizes the detected position of the driver determined by the driver detector module 600 to detect the exact face position of the driver. As will be described in more detail below, the face detector module 602 may also receive inputs from modules located within the car monitoring module 518, such as seat height and/or position information. The eye activity tracker module 604 tracks and eye position of the driver to determine the position, orientation, and direction of the driver's eyes relative to the determined head and face positions. Based upon this information, the driving monitoring module 516 may determine incident angles of the driver's eyes upon the rear view mirror, the left side mirror, and the right side mirror.

The car monitoring module 518 includes a vehicle type module 606, a seat height and/or position module 608, and a vehicle monitoring module 610. The vehicle type module 606 determines certain characteristics about the vehicle 102. For example, the vehicle type module 606 determines characteristic associated with the vehicle 102, such as a vehicle make and model, and associated dimensional characteristics associated with the vehicle 102. For example, the vehicle type module 606 may provide data and information associated with locations, dimensions, and ranges of motion for adjustability of mirrors, range of adjustability of a driver's seat, fender shapes and dimensions, and other characteristics associated with the vehicle 102.

The seat height and/or position module 608 determines certain characteristics associated with a driver's seat within the vehicle 102. These determinations may be based upon information received from other modules, such as the driver monitoring module 516. For example, the driver's seat height and seat position may be determined from the range of adjustability of the driver's seat. Additionally, an inclination of the driver's seat may also be determined by the seat height and/or position module 608. As described above, the seat height and/or position module 608 may provide information to other modules, such as providing a seat height and/or position adjustment to the face detector module 602 located within the driver monitoring module 516.

The vehicle monitoring module 610 determines operational characteristics associated with the vehicle 102. For example, a speed, steering angle, braking status, engine status, and mirror adjustment positions of the vehicle 102 may all be determined by the vehicle monitoring module 610. Determination of operational characteristics by the vehicle monitoring module 610 may utilize information received from other modules. For example, a determination of the mirror adjustment positions may utilize information provided by the vehicle type module 606 regarding the range of adjustability of the mirrors within the vehicle 102.

The information generated by the vehicle type module 606, the seat height and/or position module 608, and the vehicle monitoring module 610, the car monitoring module 518 may determine a range of characteristics associated with the vehicle 102. These characteristics may be provided to other modules within the dynamic vehicle blind spot detection and prediction device 402, as described above and in more detail below.

The dynamic blind spot determination module 520 includes a driver modeling module 612 and a blind spot calculation module 614. The driver modeling module 612 utilizes average characteristics and ranges of these characteristics for a typical driver of the vehicle 102. For example, a height or height range of a typical driver, a general direction where a typical driver looks, and other characteristics are used to build an initial model for the driver of the vehicle 102. The driver modeling module 612 further refines its modeling capabilities using information and data provided by the driver monitoring module 516 and the car monitoring module 518. The initial and refined models of the driver may be stored within the database 404, the memory 508, or within local memory (not shown) within the dynamic blind spot determination module 520.

The driver modeling module 612 also utilizes information and data provided by the driver monitoring module 516 and the car monitoring module 518 to detect a change in the driver's orientation within the vehicle 102. The blind spot calculation module 614 receives any detected change in the driver's orientation and automatically calculates a change to blind spots, such as the left blind spot region 116, the right blind spot region 118, and the rear blind spot region 120, associated with the vehicle 102. Accordingly, the blind spot calculation module 614 may automatically determine dynamic blind spot changes associated within the vehicle 102. The automatically calculated change to the blind spots may be based upon changes in the driver's orientation within the vehicle 102 and may be based, among other things, upon characteristics associated with the vehicle 102 including dimensional characteristics and present operating characteristics.

FIG. 7 and FIG. 8 below illustrate example processing that may be performed in association with the present subject matter and that may be executed by a device, such as the CPU 500 of the dynamic blind spot determination and prediction device 402. Alternatively, the processes described may be executed by separate processing components within one or more of the driver monitoring module 516, the car monitoring module 518, and the dynamic blind spot determination module 520, as described above and as appropriate.

FIG. 7 is a flow chart of an example of an implementation of a process 700 that automatically calculates changes to a blind spot of a vehicle based upon detected changes in a driver's orientation within the vehicle. At block 702, the process 700 monitors a driver's orientation within a vehicle. At block 704, the process 700 detects a change in the driver's orientation. At block 706, the process 700 calculates a change to a blind spot of the vehicle based upon the detected change in the driver's orientation.

FIG. 8 is a flow chart of an example of an implementation of a process 800 that automatically calculates changes to a blind spot of a vehicle by executing a probabilistic model, identifies dangerous and potentially dangerous situations, and alerts other vehicles of any identified dangerous or potentially dangerous situations. At block 802, the process 800 monitors a driver's orientation within a vehicle, such as the vehicle 102. At decision point 804, the process 800 makes a determination as to whether there has been a change in the driver's orientation within the vehicle 102. It should be noted that time out procedures and other error control procedures are not illustrated within the example process 800 for ease of illustration purposes. However, it is understood that all such procedures are considered to be within the scope of the present subject matter for the example process 800.

When a determination is made that there has not been a change in the driver's orientation within the vehicle 102, the process 800 returns to block 802 and continues monitoring the driver's orientation. When a determination is made at decision point 804 that the driver's orientation has changed, the process 800 determines a characteristic or characteristics of the change in the driver's orientation at block 806. For example, characteristics of the change in the driver's orientation may be obtained from any of the modules described above in association with the driver monitoring module 516. Any other characteristics that may be associated with a change in orientation of a driver may be used by the process 800 and all are considered within the scope of the present subject matter.

At block 808, the process 800 compares the determined characteristic(s) with known dangerous situations. For example, the process 800 may utilize information stored within the dangerous situation history repository 408 and may compare the change in the determined characteristic(s) with any known dangerous situations or situation profiles stored within the dangerous history repository 408. At decision point 810, the process 800 makes a determination as to whether the determined change in the driver's orientation is associated with any known dangerous situation. When a determination is made that the change in the driver's orientation is associated with a known dangerous situation, the process 800 alerts the driver of the vehicle 102 at block 812. The process 800 also alerts drivers of other vehicles in proximity to the vehicle 102 at block 814.

At decision point 816, the process 800 makes a determination as to whether the danger was realized in the present situation (e.g., a collision) or whether the danger was averted by the alerts generated at blocks 812 and 814, respectively. When a determination is made the danger was not realized, the process 800 returns to block 802 to monitor the driver's orientation and to iterate between block 802 and decision point 804 to determine whether the driver's orientation has changed.

When a determination is made at decision point 816 that the danger was realized, such as by a collision or near collision, the process 800 creates and stores a dangerous situation profile to a known dangerous situation database at block 818. For example, the process 800 may create and store a dangerous situation profile to the dangerous situation history repository 408 within the database 404. The process 800 returns to block 802 and decision point 804 to iterate as described above.

Returning to the description of decision point 810, when a determination is made at decision point 810 that the change in the driver's orientation is not associated with the known dangerous situation, the process 800 begins a sequence of probabilistic calculations of potential danger based upon information obtained from the driver monitoring module 516, the car monitoring module 518, and the dynamic blind spot determination module 520, as appropriate, to determine a probability of danger, as described in more detail below.

At block 820, the process 800 determines a probability of potential danger due to the change in the driver's orientation. At block 822, the process 800 calculates a change to a blind spot associated with the vehicle 102. For example, calculating the change to the blind spot includes calculating a change to at least one of a blind spot shape, blind spot dimensions, and a blind spot location. At block 824, the process 800 determines a probability of potential danger due to the calculated change in the blind spot.

At block 826, the process 800 determines one or more vehicle characteristics associated with the vehicle 102. For example, the process 800 may determine a size of the vehicle 102, a mirror adjustment, a speed, a driver's seat height, a driver's seat position, and a steering angle of the vehicle 102 as characteristics associated with the vehicle 102. Additionally, characteristics associated with the vehicle 102 may be obtained from any of the modules described above in association with the car monitoring module 518. Any other characteristics that may be associated with the vehicle 102 may be used by the process 800 and all are considered within the scope of the present subject matter. At block 828, the process 800 determines a probability of potential danger due to the determined vehicle characteristic(s).

At block 830, the process determines information about any other vehicle travelling in proximity to the vehicle 102. For example, characteristics such as those described above with respect to the vehicle 102 may also be collected for other vehicles travelling in proximity to the vehicle 102. This information may be determined by sensors (not shown) associated with either the vehicle 102 or another vehicle, such as the vehicle 104 and the vehicle 106. Alternatively, this information may be determined by each of the respective vehicles and communicated to the vehicle at which the process 800 is executed. When this information is collected at a vehicle other than a vehicle that is executing the process 800, the process 800 may be modified with appropriate request blocks for information and decision points to await responses to requests to be received from the other vehicles. This additional processing is not shown within FIG. 8 for ease of illustration purposes. However, it is understood that any such communications are considered within the scope of the present subject matter. At block 832, the process 800 determines a probability of potential danger due to the other vehicles travelling in proximity to the vehicle 102.

At Block 834, the process 800 runs a statistical model to determine the probability a potential danger based upon the determined probabilities of potential danger due to the change in the driver's orientation, the potential danger due to the change in the blind spot, the potential danger due to the vehicle 102's characteristic(s), and the potential danger due to characteristics associated with any other vehicle travelling in proximity to the vehicle 102. As such, the statistical model may include a model of at least one of dangerous driver characteristics, dangerous blind spot coordinates, dangerous information about the first vehicle, and dangerous characteristics of an environment surrounding the first vehicle. Further, the statistical model may be any statistical model capable of considering the respective probabilities generated by the process 800. For example, the statistical model may be any of a variety of probabilistic models, such as a Gaussian, uniform, or other stochastic/statistical model, with a component representing each of the respective probabilities. Additionally, threshold levels for a value may be specified for a result generated by execution of the statistical model, where the threshold may be adjusted based upon preferences and used to trigger alerts as described above and in more detail below.

At decision point 836, the process 800 makes a determination as to whether there is a potential for danger associated with the results generated by execution of the statistical model. When a determination is made at decision point 836 that there is a potential for danger associated with the results generated by execution of the statistical model, the process 800 continues to block 812 and continues processing as described above to generate appropriate alerts. Additionally, the statistical model of dangerous situations may be updated with at least one of a new dangerous driver characteristic, new dangerous blind spot coordinates, new dangerous information about the vehicle 102, and a new dangerous characteristic of the environment surrounding the vehicle 102. This updated statistical model information may be stored as either a new dangerous situation profile or an existing dangerous situation profile may be updated within this information within the known dangerous situation database at block 818, as described above. When a determination is made at decision point 836 that there is not a potential for danger associated with the results generated by execution of this statistical model, the process 800 returns to block 802 and decision point 804 to iterate as described above.

Accordingly, the process 800 monitors changes to a driver's orientation within a vehicle. The process 800 calculates probabilities of potential danger due to changes in the driver's orientation, due to changes in a blind spot based upon the changes in the driver's orientation, and due to operational characteristics of the vehicle 102 and any other vehicles travelling in proximity to the vehicle 102. The process 800 applies a statistical model to the determined probabilities and alerts the driver of the vehicle 102 and any other vehicle travelling in proximity to the vehicle 102 based upon a determined potentially dangerous situation. A threshold may be assigned for triggering of the determination of a potentially dangerous situation. The process 800 also processes and updates dangerous situation information, such as dangerous situation history profiles, within a database of known dangerous situations, such as the dangerous situation history repository 408 stored within the database 404. Accordingly, the process 800 enhances the dangerous situation history repository 408 over time to improve identification of dangerous situations.

Regarding the probabilistic model described in association with FIG. 8 above, the following is a description of an example of a probabilistic model that may be used by a process, such as the process 800, to determine a probability of potential danger associated with the present subject. The following equation (1) describes an example probabilistic model.

$$\max_\Theta \text{Prob}(\Theta,X,Y,Z) \qquad (1)$$

Within the example equation (1), the variable "$\Theta$" represents a set of coordinates of dangerous blind spots, the variable "X" represents characteristics of a change in orientation of a driver, the variable "Y" represents characteristics of the driver's vehicle, and the variable "Z" represents characteristics of other vehicles, as described above.

The probability calculation of equation (1) may be approximated as a product of functions relevant to various objects by assuming their independence. For example, the following example expression within equation (2) may be used to calculate the variable "X" within equation (1).

$$X=(X_1,X_2) \qquad (2)$$

Within the example equation (2), the variable "$X_1$" represents information for a head of a driver and the variable "$X_2$" represents information about driver's eyes. It should be understood that many other variables may be included in the probabilistic expression for equation (1) and any other equation described and that similar expressions for each variable may be created. Based upon such an example expression for the variable "X," the following example equation (3) may form an example expansion of equation (1).

$$\text{Prob}(\Theta,X,Y,Z) \approx \text{Prob}(\Theta,X_1,Y,Z)\text{Prob}(\Theta,X_2,Y,Z) \qquad (3)$$

Similar expansions may be performed for other variables. The equation (1) may be modeled as a Gaussian distribution. However, it should be noted that any of a variety of probabilistic or other stochastic/statistical models may be used. The model parameters "$\Theta$" may be estimated via monitoring traffic. System data, such as parameters for the variables "X," "Y," and "Z" may be collected from monitoring a network of vehicles and detecting traffic accidents. Blind spots found as described may be labeled as dangerous if there were collisions or near collisions during monitoring.

As described above in association with FIGS. 1 through 8, the example systems and processes provide automatic dynamic vehicle blind spot determination based upon changes in a driver's orientation within a vehicle, automatic calculation of changes to a blind spot of a vehicle by executing a probabilistic model, automatic identification of dangerous and potentially dangerous situations, and automatic alerts to the driver's vehicle and other vehicles of any identified dangerous or potentially dangerous situations. It should be understood that the previous description illustrates example approaches to performing the automated dynamic vehicle blind spot determination of the present subject matter. Many other variations and additional activities associated with automatic dynamic vehicle blind spot determination are possible and all are considered within the scope of the present subject matter.

Those skilled in the art will recognize, upon consideration of the above teachings, that certain of the above examples are based upon use of a programmed processor such as the CPU 500. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   monitoring, via a computing device, a driver's orientation within a first vehicle;
   detecting a change in the driver's orientation;
   calculating, in response to detecting the change in the driver's orientation, a change to a rear blind spot dimensional area of the first vehicle, where the rear blind spot dimensional area comprises coordinates and dimensions of an area behind a peripheral view area of the driver and outside of rear viewable areas of viewable mirrors of the vehicle;
   applying the calculated change to the rear blind spot dimensional area to a statistical model of dangerous vehicle situations, where the statistical model to which the calculated change to the rear blind spot dimensional area is applied comprises a probabilistic function comprising at least one of a Gaussian distribution and a uniform distribution of at least one of the dangerous blind spot coordinates, dangerous information about the first vehicle, and dangerous characteristics of a vehicular environment surrounding the first vehicle; and
   predicting a dangerous situation associated with the first vehicle based upon a result of the calculated change to the rear blind spot dimensional area applied to the statistical model of the dangerous vehicle situations.

2. The method of claim 1, where detecting the change in the driver's orientation comprises detecting a change in at least one of an eye position of the driver, a head position of the driver, a body position of the driver, and an activity of the driver.

3. The method of claim 1, where calculating, in response to detecting the change in the driver's orientation, the change to the rear blind spot dimensional area comprises calculating a change to at least one of a blind spot shape and blind spot dimensions.

4. The method of claim 1, further comprising:
   determining at least one characteristic associated with the first vehicle, the at least one characteristic comprising at least one of a size of the first vehicle, a mirror adjustment associated with the first vehicle, a speed of the first vehicle, a driver's seat height, a driver's seat position, and a steering angle of the first vehicle; and
   where calculating, in response to detecting the change in the driver's orientation, the change to the rear blind spot dimensional area comprises calculating the change to the rear blind spot dimensional area based upon the determined at least one characteristic associated with the first vehicle.

5. The method of claim 1, further comprising communicating information associated with at least one of the calculated change to the rear blind spot dimensional area and the predicted dangerous situation to at least one of the first vehicle and a second vehicle.

6. The method of claim 1, where:
   the statistical model of dangerous vehicle situations further comprises dangerous driver orientation characteristics; and
   applying the calculated change to the rear blind spot dimensional area to the statistical model of dangerous vehicle situations further comprises applying the calculated change to the rear blind spot dimensional area to the dangerous driver orientation characteristics within the statistical model.

7. The method of claim 1, where:
   the at least one of the Gaussian distribution and the uniform distribution of the dangerous information about the first vehicle comprises mathematical relationships associated with at least one of a dangerous vehicle speed, a dangerous vehicle orientation, and a dangerous steering angle relative to speed; and
   the at least one of the Gaussian distribution and the uniform distribution of the dangerous characteristics of a vehicular environment surrounding the first vehicle comprises mathematical relationships associated with at least one of a dangerous weather condition and dangerous conditions associated with other surrounding vehicles.

8. The method of claim 1, further comprising updating the statistical model of dangerous vehicle situations based upon data associated with at least one of an actual collision and a near collision.

9. The method of claim 8, where updating the statistical model of dangerous vehicle situations based upon the data associated with at least one of the actual collision and the near collision comprises updating the statistical model of dangerous vehicle situations with at least one of a new dangerous driver characteristic, new dangerous blind spot coordinates, new dangerous information about the first vehicle, and a new dangerous characteristic of the environment surrounding the first vehicle.

10. A system comprising:
    a memory adapted to store a statistical model of dangerous vehicle situations; and
    a processor programmed to:
      monitor a driver's orientation within a first vehicle;
      detect a change in the driver's orientation;
      calculate, in response to detecting the change in the driver's position, a change to a rear blind spot dimensional area of the first vehicle, where the rear blind spot dimensional area comprises coordinates and dimensions of an area behind a peripheral view area of the driver and outside of rear viewable areas of viewable mirrors of the vehicle;
      apply the calculated change to the rear blind spot dimensional area to the statistical model of dangerous vehicle situations, where the statistical model to which the calculated change to the rear blind spot dimensional area is applied comprises a probabilistic function comprising at least one of a Gaussian distribution and a uniform distribution of at least one of the dangerous blind spot coordinates, dangerous information about the first vehicle, and dangerous characteristics of a vehicular environment surrounding the first vehicle; and
      predict a dangerous situation associated with the first vehicle based upon a result of the calculated change to the rear blind spot dimensional area applied to the statistical model of dangerous vehicle situations.

11. The system of claim 10, where, in being programmed to detect a change in the driver's orientation, the processor is programmed to detect a change in at least one of an eye position of the driver, a head position of the driver, a body position of the driver, and an activity of the driver.

12. The system of claim 10, where, in being programmed to calculate, in response to detecting the change in the driver's orientation, the change to the rear blind spot dimensional area, the processor is programmed to calculate a change to at least one of a blind spot shape and blind spot dimensions.

13. The system of claim 10, where the processor is further programmed to:
    determine at least one characteristic associated with the first vehicle, the at least one characteristic comprising at least one of a size of the first vehicle, a mirror adjustment associated with the first vehicle, a speed of the first vehicle, a driver's seat height, a driver's seat position, and a steering angle of the first vehicle; and where, in being programmed to calculate, in response to detecting the change in the driver's orientation, the change to the rear blind spot dimensional area, the processor is programmed to calculate the change to the rear blind spot dimensional area based upon the determined at least one characteristic associated with the first vehicle.

14. The system of claim 10, where the processor is further programmed to communicate information associated with at least one of the calculated change to the rear blind spot dimensional area and the predicted dangerous situation to at least one of the first vehicle and a second vehicle.

15. The system of claim 10, where:
the at least one of the Gaussian distribution and the uniform distribution of the dangerous information about the first vehicle comprises mathematical relationships associated with at least one of a dangerous vehicle speed, a dangerous vehicle orientation, and a dangerous steering angle relative to speed; and
the at least one of the Gaussian distribution and the uniform distribution of the dangerous characteristics of a vehicular environment surrounding the first vehicle comprises mathematical relationships associated with at least one of a dangerous weather conditions and dangerous conditions associated with other surrounding vehicles.

16. The system of claim 10, where the processor is further programmed to update the statistical model of dangerous vehicle situations based upon data associated with at least one of an actual collision and a near collision.

17. The system of claim 16, where, in being programmed to update the statistical model of dangerous vehicle situations based upon the data associated with at least one of an actual collision and a near collision, the processor is programmed to update the statistical model of dangerous vehicle situations with at least one of a new dangerous driver characteristic, new dangerous blind spot coordinates, new dangerous information about the first vehicle, and a new dangerous characteristic of the environment surrounding the first vehicle.

18. A system, comprising:
a memory adapted to store a statistical model of dangerous vehicle situations that comprises a probabilistic function comprising at least one of a Gaussian distribution and a uniform distribution of at least one of dangerous blind spot coordinates, dangerous information about a first vehicle, and dangerous characteristics of a vehicular environment surrounding the first vehicle; and
a processor programmed to:
monitor a driver's orientation within the first vehicle;
detect a change in the driver's orientation comprising at least one of a change of an eye position of the driver, a change of a head position of the driver, a change of a body position of the driver, and a change of an activity of the driver;
determine at least one characteristic associated with the first vehicle, the at least one characteristic comprising at least one of a size of the first vehicle, a mirror adjustment associated with the first vehicle, a speed of the first vehicle, a driver's seat height, a driver's seat position, and a steering angle of the first vehicle;
calculate a change to a rear blind spot dimensional area comprising at least one of a blind spot shape and blind spot dimensions of the first vehicle in response to the detected change in the driver's orientation and the determined at least one characteristic associated with the first vehicle, where the rear blind spot dimensional area comprises coordinates and dimensions of an area behind a peripheral view area of the driver and outside of rear viewable areas of viewable mirrors of the vehicle;
read the statistical model of dangerous vehicle situations that comprises the probabilistic function comprising at least one of the Gaussian distribution and the uniform distribution of the at least one of the dangerous blind spot coordinates, The dangerous information about the first vehicle, and the dangerous characteristics of the vehicular environment surrounding the first vehicle from the memory;
apply at least one of the detected change in the driver's orientation and the calculated change to the rear blind spot dimensional area to the statistical model of the dangerous vehicle situations that comprises the probabilistic function comprising at least one of the Gaussian distribution and the uniform distribution of the at least one of the dangerous blind spot coordinates, the dangerous information about the first vehicle, and the dangerous characteristics of the vehicular environment surrounding the first vehicle;
predict a dangerous situation associated with the first vehicle based upon a result of the at least one of the detected change in the driver's orientation and the calculated change to the rear blind spot dimensional area applied to the statistical model of the dangerous vehicle situations that comprises the probabilistic function comprising at least one of the Gaussian distribution and the uniform distribution of the at least one of the dangerous blind spot coordinates, the dangerous information about the first vehicle, and the dangerous characteristics of the vehicular environment surrounding the first vehicle;
communicate information associated with at least one of the calculated change to the rear blind spot dimensional area and the predicted dangerous situation to at least one of the first vehicle and a second vehicle;
update the statistical model of dangerous vehicle situations based upon data associated with the predicted dangerous situation; and
store the updated statistical model of dangerous vehicle situations to the memory.

* * * * *